US005580686A

United States Patent [19]

Shi et al.

[11] Patent Number: 5,580,686
[45] Date of Patent: Dec. 3, 1996

[54] ELECTROLYTIC CELL AND ELECTROLYTIC PROCESS

[75] Inventors: Jie Shi, Arlington; Arthur A. Massucco, Natick; Denis G. Fauteux, Acton, all of Mass.

[73] Assignee: Arthur D. Little, Inc., Cambridge, Mass.

[21] Appl. No.: 542,710

[22] Filed: Oct. 13, 1995

[51] Int. Cl.$^6$ ...................................................... H01M 4/66
[52] U.S. Cl. ........................ 429/245; 429/191; 429/218; 429/233; 429/244; 429/252
[58] Field of Search .................................. 429/218, 233, 429/244, 252, 191, 245

[56] References Cited

U.S. PATENT DOCUMENTS 5,262,254  11/1993  Koksbang et al. ...................... 429/192
5,395,711  3/1995  Tahara et al. ............................ 429/197
5,436,091  7/1995  Shackle et al. ......................... 429/192

FOREIGN PATENT DOCUMENTS 2119204   9/1994  Canada .
93111938  9/1994  European Pat. Off. .

Primary Examiner—M. Nuzzolillo
Attorney, Agent, or Firm—Dick and Harris

[57] ABSTRACT

An electrolytic cell having an electrolyte, a first and second electrode and a primer comprised of lithium polysilicate and carbon, applied to at least one of the first and second electrodes, wherein the primer is chemically and electrochemically stable and electronically conductive so as to decrease interfacial resistance in the cell to enhance columbic efficiency.

15 Claims, 2 Drawing Sheets

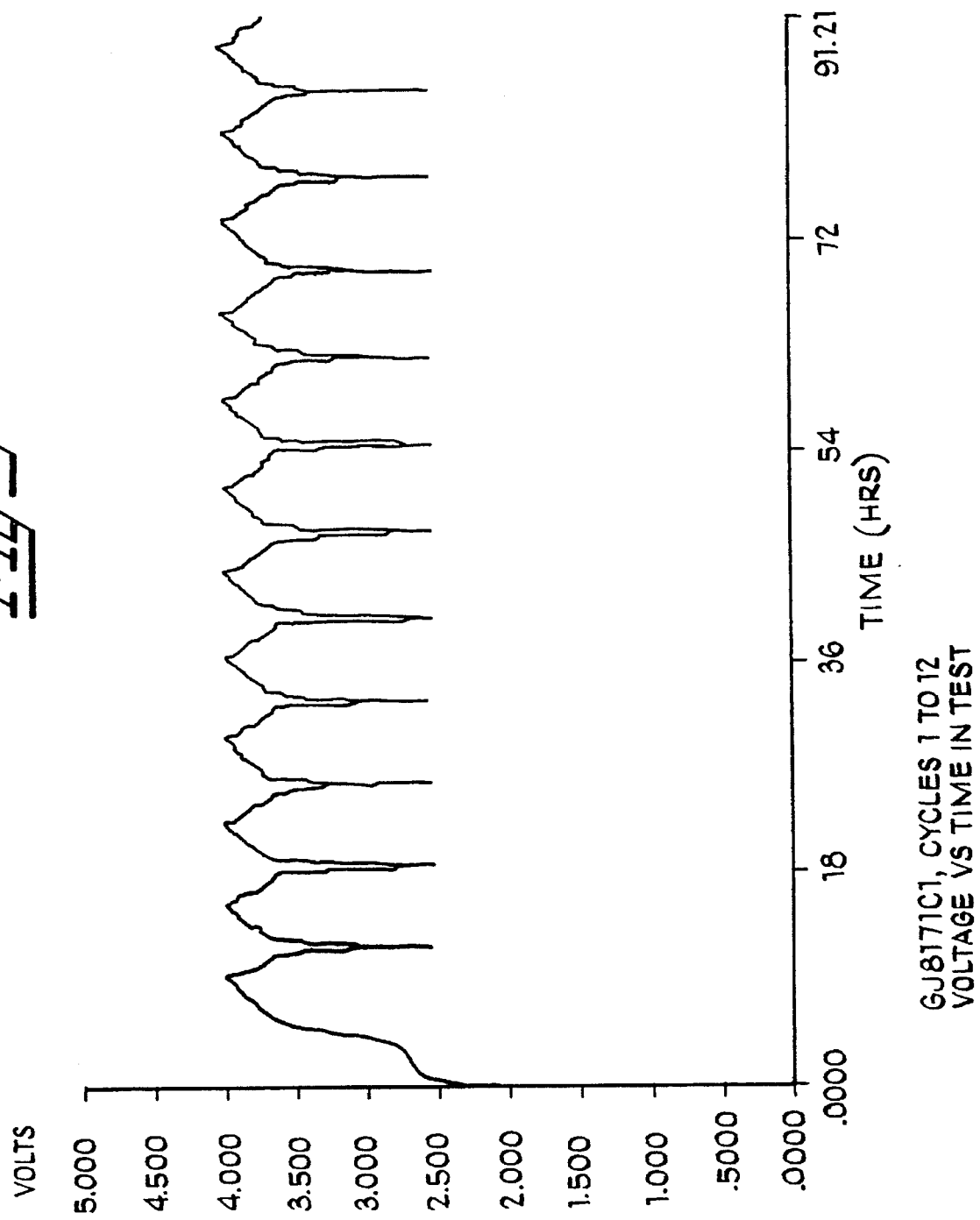

ELECTROLYTIC CELL AND ELECTROLYTIC PROCESS

BACKGROUND OF THE INVENTION

1. Field of the Invention

The present invention relates in general to electrolytic cells and, more particularly, to an electrolytic cell and the associated process for the formation of an electrolytic cell, wherein a primer comprised of lithium silicate and carbon is placed between the current collector and the electrode active material to substantially reduce contact resistance and consequently increase columbic efficiency while providing excellent electrochemical/chemical stability.

2. The Prior Art

Rechargeable, or secondary cells, have been known in the art for many years. Furthermore, secondary cells constructed with a primer placed between the current collector and the active material have likewise been known in the art. (See for example, U.S. Pat. No. 5,262,254 to Koksbang, et al.) Although such lithium rechargeable batteries have proven to be functional, they have not solved the problem of relatively high interfacial resistance between the electrode active material and the current collector. Indeed, it is well known that the power density and cycle life of such rechargeable batteries is reduced due to this increased level of cell resistance.

The electrode current collector of an electrolytic cell serves the primary function of conducting the flow of electrons between the active material of the electrode and the battery terminals. Fluctuations in the surface contacts between the active material and the current collector, therefore, increase the internal resistance of an electrolytic cell thereby decreasing both cycle life and power density. Therefore, what is needed, is an interface or "primer" layer between the current collector and the electrode active material which will promote and maintain contact between the electrode active material and the current collector so as to minimize the internal resistance of the cell.

In order to decrease the interfacial resistance between the current collector and the electrode active material, various approaches have been pursued, including chemical and mechanical modifications of the current collector surface layer. Although such modifications have proven helpful, they exhibited high levels of interfacial resistance due to inadequate mechanical and electrical contact between the current collector and the electrode active material as well as the inability to increase electronic conductivity. Furthermore, because of their chemical composition, these modifications have been limited to use on only one of the two electrodes, usually the anode.

Although the prior art does disclose the use of a primer, none of said art discloses the use of an alkali metal silicate and carbon based primer to reduce contact resistance and to enhance the columbic efficiency of the cell while providing excellent chemical/electrochemical stability. U.S. Pat. No. 5,262,254 ("'254 patent") to Koksbang, et al. discloses the use of a carbon based primer on the positive electrode current collector which prevents corrosion to the positive electrode current collector from the electrolyte. Furthermore, the '254 patent requires that the carbon based primer contain one or more conductive polymers and is only applied to the positive electrode current collector. Accordingly, while the use of the carbon/polymer primer in Koksbang, et al. serves to prevent corrosion of the positive electrode current collector—it does not utilize a primer comprised of carbon and a metal polysilicate, nor is the primer in Koksbang et al. capable of serving as a means of reducing contact resistance and consequently increasing columbic efficiency in either or both of the positive or negative electrodes.

European Patent Application 93, 111,938.2 discloses the use of a lithium silicate in conjunction with both carbon and a binder for use solely as the anode active material. The lithium silicate serves to absorb and release lithium ions during cell operation by electrochemical reactions in a nonaqueous electrolyte.

It is thus an object of the present invention to provide an electrolytic cell having a primer composed of an alkali metal polysilicate and carbon, without a binder, which is operatively placed between the electrode active material and its current collector.

It is also an object of the present invention to provide an electrolytic cell having a primer which is chemically and electrochemically stable so as to reduce contact resistance and consequently enhance the columbic efficiency of an electrolytic cell.

It is still further an object of the present invention to provide an electrolytic cell wherein a primer compound of an alkali metal polysilicate and carbon is applied to one or both of an anode and cathode current collector.

These and other objects of the present invention will become apparent in light of the attached Specification, Claims, and Drawings.

SUMMARY OF THE INVENTION

The present invention comprises an electrolytic cell (or rechargeable battery) having an electrolyte, a first electrode and a second electrode, and a primer comprising an alkali metal polysilicate and carbon which is chemically and electrochemically stable and electronically conductive and which is applied to at least one of the first and second electrode current collectors.

In a preferred embodiment of the electrolytic cell, the first electrode is a cathode and the second electrode is an anode. In addition, the primer may be applied to both the cathode and the anode current collector.

In another preferred embodiment of the electrolytic cell, the first electrode and the second electrode comprise a current collector and an active material. The primer is applied to the current collector and the active material is then operatively applied to the primed surfaces and the current collector. Also, the alkali metal polysilicate includes lithium polysilicate.

In a preferred embodiment of the electrolytic cell, the metal polysilicate is of the general formula $M_xSi_yO_z$ wherein M is an alkali metal, such as lithium, wherein X is greater than or equal to one, Y is greater than or equal to two, Z is greater than or equal to one, and the ratio of X to Y is less than or equal to two. Furthermore, the primer includes carbon selected from the group consisting of graphite and carbon black.

In another preferred embodiment of the electrolytic cell the primer has a thickness less than or equal to 5 microns after it is applied to a corresponding one of the first and second electrode current collectors. Furthermore, in this preferred embodiment, the primer can withstand temperatures up to and including 400 degrees Celsius without causing performance, structural and compositional degradation thereto. Also, the primer is substantially insoluble in the electrolyte.

In a preferred embodiment of the electrolytic cell, one of the first and second electrode current collector is constructed with aluminum. In another preferred embodiment of the electrolytic cell one of the first and second electrode current collector is constructed with copper. And in another preferred embodiment of the electrolytic cell the first electrode current collector is constructed with aluminum and the second electrode current collector is constructed with copper.

A process for fabricating an electrolytic cell comprising the steps of: (1) applying a primer comprising alkali metal polysilicate and carbon to at least one of a first and second electrode current collector; (2) applying an active material; and (3) inserting an electrolyte between the first and second electrodes.

In a preferred embodiment of the process, the process further comprises the step of applying the primer to both the first and second electrode current collectors.

In another preferred embodiment of the process, the primer is of the general formula of $M_xSi_yO_z$, wherein M is an alkali metal, such as lithium; X is greater than or equal to one; Y is greater than or equal to two; Z is greater than or equal to one; and the ratio of X to Y is less than or equal to two.

BRIEF DESCRIPTION OF THE DRAWINGS

1.
FIG. 3 is a graphical representation of the charge and discharge cycles of an electrolytic cell plotted against time.

BEST MODE FOR PRACTICING THE INVENTION

Figure 1:
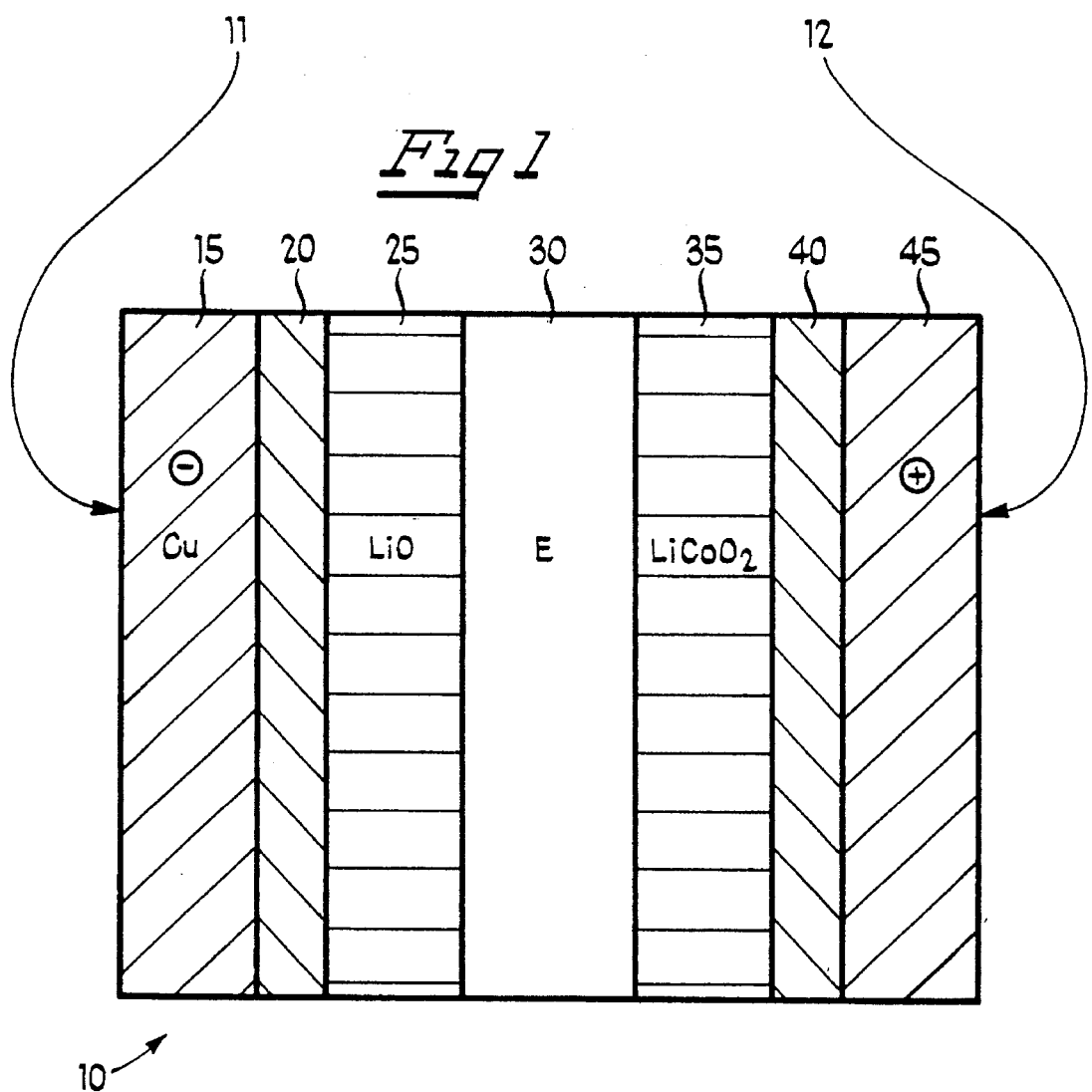
FIG. 1 is a schematic diagram of an electrolytic cell.
2.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Electrolytic cell 10, which in a preferred embodiment may comprise a rechargeable battery, is shown in FIG. 1 as including negative electrode side 11, electrolyte 30, and positive electrode side 12. The negative electrode side 11 (generally referred to as the anode) includes current collector 15, typically constructed of nickel, iron, stainless steel, and/or copper foil, and a body of negative electrode active material 25. In a preferred embodiment, negative electrode active material 25 consists of lithium, or compounds and alloys thereof—although other materials are also contemplated for use. Positive electrode side 12 (generally referred to as the cathode) includes current collector 45, typically constructed of aluminum, nickel, iron, and/or stainless steel, and a body of positive electrode active material 35. Positive electrode active material 35 is usually different than the negative electrode active material 25. Typical positive electrode active materials may include transition metal oxides, sulfide, and/or electroactive conducting polymer compounds having a reversible lithium insertion ability. Of course, other conventional compounds for use as the active material are also contemplated for use and association with the primer and its corresponding electrode.

Figure 2:
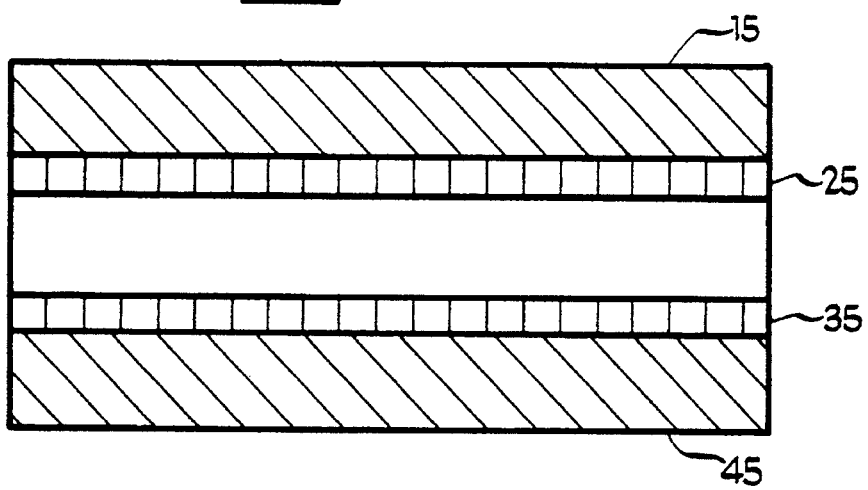
FIG. 2 is a schematic diagram of an electrolytic cell.
3.

A problem associated with rechargeable lithium batteries, as shown in FIG. 2, is the increased cell resistance caused by an inadequate or interrupted interfacial contact between the current collectors, such as current collectors 15, 45, and the electrode active materials, such as electrode active material 25, 35. During the reduction and oxidation reactions that take place within the cell, the electrode active materials 25, 35 shrink and/or expand, pull away from, or lose contact with the current collectors. The loss of contact between the current collectors 15, 45 and the electrode active materials 25, 35 increases cell resistance and thereby decreases power output, columbic efficiency, and cycle life of the cell.

In order to improve interfacial contact between the anode current collector 15 and the anode active materials 25, a primer layer 20, (FIG. 1,) is operatively placed between the anode current collector 15 and the anode active material 25. Also, as will be explained, a second primer layer 40 (FIG. 1) may also be operatively placed between cathode current collector 45 and cathode active material 35.

With respect to anode 11, primer layer 20 may be constructed with a compound of an alkali metal polysilicate and carbon. For purposes of explanation of the present invention, the metal polysilicate will be described as a lithium polysilicate. However, it will be understood to those with ordinary skill in the art, that the principles associated with the claimed and described invention would also be applicable to any alkali metal polysilicate which had the ability to exhibit chemical/electrochemical stability, adhesion to the metallic current collector and, in combination with carbon, will electronically conduct electrons of anode active material 25.

Lithium polysilicate primer layer 20 is of the general formula $Li_xSi_yO_z$ where X is greater than or equal to one, Y is greater than or equal to two, Z is greater than or equal to one, and the ratio of X to Y is less than or equal to two. Lithium polysilicate primer layer 20 also includes carbon which is contemplated to be of a small particle type that does not promote the chemical/electrochemical decomposition of electrolyte 30. In a preferred embodiment, the primer layer at the anode would include graphite and a primer layer at the cathode would include graphite and/or carbon black. It should be noted that primer material 20 does not include a binder material in the lithium polysilicate compound because of the excellent adhesion properties of the lithium polysilicate and carbon primer. Indeed, due to the omission of a binder, and more particularly a polymer binder, the polysilicate can be heat treated to extremely high temperatures, such as 400 degrees Celsius, without a concern of degradation of the carbon or loss of adhesion of the carbon to the aluminum anode.

It has been found that the use of the present lithium polysilicate and carbon compound exhibits significant advantages which not only increase the cycle life of rechargeable lithium battery 10, but which also reduces contact resistance and consequently increases the columbic efficiency therein as well. For example the lithium polysilicate and carbon primer 20, 40 is (1) substantially chemically and electrochemically stable during either oxidation or reduction; (2) is insoluble in the electrolyte which precludes erosion of the interface between the current collector and the active material; (3) is a good electronic conductor; (4) has excellent adhesion to both aluminum and copper current collectors; (5) can be dehydrated at a temperature up to and including 400 degrees Celsius; and (6) is substantially chemically stable with regards to both water and ambient atmosphere which increases its ease of use and application. (See, e.g. FIG. 3)

In a preferred embodiment of the present invention, a primer layer of metal polysilicate and carbon is applied to:

(1) the anode only, or (2) to both the anode and the cathode to decrease interfacial resistance between the current collector and the electrode active material. The ability to use the lithium polysilicate carbon primer on both the anode and the cathode provides an economical advantage and also increases the ease of manufacturing the cell. The lithium polysilicate carbon primer dehydrates at a temperature less than or equal to 500 degrees Celsius, which allows the primer to be directly placed onto the current collector surface and subsequently heat cured without risk of degradation to the underlying aluminum or copper current collectors. Furthermore, because the primer can be prepared in an aqueous solution there is no need for the use of an organic solvent.

In support of the benefits of the above-identified exhibited characteristics of primer layer 20 and 40: namely, decreased interfacial resistance between the electrode active material and current collector and improved chemical/electrochemical stability—several experiments were carried out using a prior art current collector surface modification in comparison to the claimed invention. Accordingly, four of such experiments and their results are outlined hereinbelow.

At the outset, it should be noted that all three of the experiments included the use of a current collector, a primer and an active material. The current collectors used included aluminum at the cathode and copper at the anode. The active materials used were $LiCoO_2$ at the cathode and graphite at the anode. In each experiment, the use of the lithium polysilicate primer was compared to the use of a prior art primer. The prior art primer had the following characteristics:

the formula of the prior art primer being:

| | |
|---|---|
| Polyisobutylene, 10% in toluene | 6.19 |
| Lithium ethylhexanoate, 10% in ethylhexanoic acid | 9.38 |
| Manganese ethylhexanoate, 37% in hexane | 42.56 |
| Graphite | 41.87 |
| | 100.00% |

EXPERIMENT NO. 1

In this experiment the effect of the present lithium polysilicate primer layer being applied to the anode was observed and compared to that of the prior art primer being applied to an anode having similar compositional structure. In both cases, a graphite paste made of graphite (Lonza KS-6) 28.16% (wt), PVDF (Aldrich) 0.58% (wt) and 1-methyl-2-pyrrolidinone (Aldrich) 71.26% was coated on a copper current collector. The 1-methyl-2-pyrrolidinone was evaporated at 120 degrees Celsius under vacuum for 12 hours on each of the respective current collectors thereby producing a graphite anode material. The active material layer of both of these electrodes contained 98% (wt) graphite and 2% (wt) PVDF.

Before making the cells (the cell utilizing the prior art and the cell utilizing the lithium polysilicate primer), both of the graphite electrodes were first soaked in an electrolyte precursor solution made from 81% (wt) 0.2 M 12-Crown-4 (Aldrich) ethylene carbonate/propylene-carbonate (1:1 wt) solution, 10% (wt) $LiAsF_6$, and 9% acrylate. Once the electrolyte precursor solution was absorbed into both of the graphite electrodes, the electrodes were then cured at 80 degrees Celsius for 15 minutes.

Symmetrical cells (a cell containing the prior art and a cell containing the lithium polysilicate primer) with two identical graphite electrodes (16 cm² area), and a gel electrolyte based on propylene carbonate, $LiAsF_6$ salt and acrylate (cured under ultraviolet light) was fabricated. AC impedance spectrum was measured on a Solarton FRA 1250/ECI 1286 at an OCV of the cell in a frequency range of 60 k to 1 Hz for both of the prior art primer cell as well as the lithium polysilicate primer cell. Accordingly, the charge transfer resistance of the electrochemical cell containing the prior art was measured to be larger than 10 ohms—thereby resulting in poor adhesion and, in turn, a cell which is difficult to assemble. The charge transfer resistance of the electrochemical cell containing the lithium polysilicate carbon primer was observed to be 0.23 ohms.

EXPERIMENT NO. 2

In this experiment the effect of the prior art primer layer and a primer layer of lithium polysilicate, both of which are applied to the cathode, were observed and compared to one another. A $LiCoO_2$ based paste made from $LiCoO_2$ (Cypress Foot) 50.4% (wt), carbon black 12.6%, plasticizer and acrylate 37.0%, was coated onto an aluminum current collector which had been treated with the prior art primer as well as on an aluminum current collector which had been treated with the lithium polysilicate primer. The paste, on both of the treated current collectors, was cured at 75 degrees Celsius for 10 minutes. Thus, two composite electrodes fabricated with an active material of $LiCoO_2$ were made; one with a current collector treated with the prior art primer, and the other with a current collector treated with the lithium polysilicate primer.

Two three electrode cells were then fabricated using both the prior art primer treated current collector and the lithium polysilicate primer treated current collector, each having the composite active material $LiCoO_2$ electrode as the working electrode (area: 4 cm²), Li as the counter and reference electrodes, and 1 M $LiAsF_6$ (FMC) propylene carbonate as the electrolyte solution.

AC impedance spectrum was then measured on a Solartron FRA 1250/ECI 1286 at OCV of the cell in a frequency range of 60 k to 1 Hz for both the prior art primer cell and the lithium polysilicate primer cell. Accordingly, the charge transfer resistance of the electrochemical cell containing the prior art primer cathode was measured to be 21.9599 ohms. The charge transfer resistance of the electrochemical cell containing the cathode treated with the lithium polysilicate carbon primer was observed to be 13.60 ohms.

EXPERIMENT NO. 3

In this experiment the effect of the prior art primer layer and a primer layer of lithium polysilicate, both of which are applied to the cathode, were observed and compared to one another. A $LiCoO_2$ based paste made from $LiCoO_2$ (Cypress Foot) 50.4% (wt), carbon black 12.6%, plasticizer and acrylate 37.0%, was coated onto an aluminum current collector which had been treated with the prior art primer as well as on an aluminum current collector which had been treated with the lithium polysilicate primer. The paste, on both of the treated current collectors, was cured at 75 degrees Celsius for 10 minutes. Thus, two composite electrodes fabricated with an active material of $LiCoO_2$ were made; one with a current collector treated with the prior art primer, and the other with a current collector treated with the lithium polysilicate primer.

Two three electrode cells were then fabricated using both the prior art primer treated current collector and the lithium polysilicate primer treated current collector, each having the composite active material $LiCoO_2$ electrode as the working electrode (area: 4 cm$^2$), Li as the counter and reference electrodes, and 1 M $LiClO_4$ (FMC) propylene carbonate as the electrolyte solution.

AC impedance spectrum was then measured on a Solartron FRA 1250/ECI 1286 at OCV of the cell in a frequency range of 60 k to 1 Hz for both the prior art primer cell and the lithium polysilicate primer cell. Accordingly, the charge transfer resistance of the electrochemical cell containing the prior art primer cathode was measured to be 33.35 ohms. The charge transfer resistance of the electrochemical cell containing the cathode treated with the lithium polysilicate carbon primer was observed to be 11.20 ohms.

EXPERIMENT NO. 4

An experiment was then conducted to determine the effect of using the lithium polysilicate carbon primer on both the anode and the cathode. A two electrode cell was made using the composite $LiCoO_2$ cathode having an aluminum current collector treated with the lithium polysilicate primer prepared in Experiment No. 2, the graphite anode having a copper current collector treated with the lithium polysilicate primer prepared in Experiment No. 1, and 1 M $LiAsF_6$ solution in a mixed solvent of ethylene carbonate and dimethyl carbonate having a molar ratio of 3:2 as the electrolyte. The working area for both the cathode and the anode was 4 cm$^2$.

The results of Experiment No. 4, as shown in FIG. 3, indicate the charge and discharge efficiency of an electrolytic cell containing the lithium polysilicate carbon primer on both the cathode and the anode as plotted in volts against cycle time. As can be seen from the figure, the cell cycle is symmetrical—i.e. the time to charge to a maximum of 4 volts and discharge to 2.5 volts is substantially identical over cycle life. Therefore, the use of a lithium polysilicate carbon primer between the electrode active material and the current collector, on both the anode and the cathode, is seen to increase the columbic efficiency of the cell, which, in turn, corresponds to symmetrical, highly efficient, and repeatable electrolytic cell charge and discharge cycles.

We claim:

1. An electrolytic cell comprising:

an electrolyte;

a first electrode and a second electrode;

a primer comprising metal polysilicate and carbon, applied to at least one of the first and second electrodes, wherein the primer is chemically and electrochemically stable and electronically conductive, wherein at least one of the first electrode and the second electrode includes a current collector, the primer and an active material;

the primer being operatively applied to the current collector, and, the active material being operatively applied to the primed surface(s) of the current collector.

2. The electrolytic cell according to claim 1, wherein the first electrode is a cathode and the second electrode is an anode.

3. The electrolytic cell according to claim 2, wherein the first and second electrodes include a cathode and an anode current collector, respectively, the primer is applied to both the cathode and the anode current collector.

4. The electrolytic cell according to claim 1, wherein the metal polysilicate includes lithium polysilicate.

5. The electrolytic cell according to claim 1 wherein the metal polysilicate is of the general formula $M_xSi_yO_z$ where;

M is an alkali metal;

X is greater than or equal to one;

Y is greater than or equal to two;

Z is greater than or equal to one; and the ratio of X to Y is less than or equal to two.

6. The electrolytic cell according to claim 1, wherein the primer includes carbon selected from the group consisting of graphite and carbon black.

7. The electrolytic cell according to claim 1, wherein the primer has a thickness less than or equal to 5 microns after it is applied to a corresponding one of the first and second electrodes.

8. The electrolytic cell according to claim 1, wherein the primer includes means for precluding excessive structural degradation upon exposure to temperatures up to and including 400 degrees Celsius, wherein the precluding means includes the metal polysilicate.

9. The electrolytic cell according to claim 1, wherein the primer is substantially insoluble in the electrolyte.

10. The electrolytic cell according to claim 1, wherein one of the first and second electrodes is constructed with aluminum.

11. The electrolytic cell according to claim 1, wherein one of the first and second electrodes is constructed with copper.

12. The electrolytic cell according to claim 1, wherein the first electrode is constructed with aluminum and the second electrode is constructed with copper.

13. A process for fabricating an electrolytic cell comprising the steps of:

applying a primer comprising metal polysilicate and carbon to a current collector of at least one of a first and second electrode;

applying an active material to the primer; and inserting an electrolyte between the first and second electrodes.

14. The process according to claim 13, further comprising the step of applying the primer to both the first and second electrodes.

15. The process according to claim 13, wherein the primer is of the general formula of $M_xSi_yO_z$, where;

M is an alkali metal;

X is greater than or equal to one;

Y is greater than or equal to two;

Z is greater than or equal to one; and the ratio of X to Y is less than or equal to two.

* * * * *